United States Patent [19]

Tauszig

[11] 4,095,236
[45] June 13, 1978

[54] ELECTRONIC STENCIL ENGRAVING MACHINE STYLUS AND SUPPORT

[75] Inventor: Julio G. Tauszig, Buenos Aires, Argentina

[73] Assignee: A. B. Dick Company, Chicago, Ill.

[21] Appl. No.: 776,594

[22] Filed: Mar. 11, 1977

Related U.S. Application Data

[63] Continuation of Ser. No. 611,821, Sep. 9, 1975, abandoned.

[30] Foreign Application Priority Data

Feb. 27, 1975 Argentina .............................. 257801

[51] Int. Cl.² ............................................. G01D 15/00
[52] U.S. Cl. ............................... 346/139 C; 101/128.4; 101/401.1; 188/1 B; 248/358 R; 346/155; 346/145; 358/296
[58] Field of Search ...................... 188/1 B; 101/128.4, 101/150, 170, 401.1; 178/6.6 B; 248/358 R; 346/139 C, 145, 155, 165, 162, 163

[56] References Cited

U.S. PATENT DOCUMENTS

| 2,541,159 | 2/1951 | Geiger | 188/1 B |
| 2,615,780 | 10/1952 | Cooley | 346/139 C |
| 3,018,153 | 1/1962 | Steen | 346/139 C |
| 3,187,668 | 6/1965 | Marsh, Jr. | 101/93.02 |
| 3,273,670 | 9/1966 | Klienlein | 188/1 B |
| 3,316,642 | 5/1967 | Councilman | 346/139 C |
| 3,346,871 | 10/1967 | Fowler | 346/139 C |
| 3,396,234 | 8/1968 | Zeuthen et al. | 178/6.6 B |
| 3,761,954 | 9/1973 | Hansen et al. | 346/139 C |
| 3,762,636 | 10/1973 | Christensen | 101/128.4 |
| 3,795,006 | 2/1972 | Engdahl et al. | 346/139 C |
| 3,824,602 | 7/1974 | Gulati | 346/139 C |

FOREIGN PATENT DOCUMENTS 698,277 11/1964 Canada ............................ 346/139 C

*Primary Examiner*—William Pieprz
*Attorney, Agent, or Firm*—Peter S. Lucyshyn

[57] ABSTRACT

A support for the stylus used in an electronic stencil cutting machine for burning or engraving information into stencil material mounted for relative movement with respect to said stylus, includes a t-shaped, blade-like body having a free end portion and a base portion, with the stylus being attached to the free end of the former. A second blade-like portion is affixed at a first end away from the base portion, to the free end portion of the body in an overlying relation, for dampening vibrations to the stylus as the latter passes over the stencil material and/or clamp for securing the material to a support surface. A support base upon which the blade-like body is mounted includes a pair of spaced members between which there is positioned a permanent magnet. The base portion of the blade-like body at least is of a magnetic material and is therefore attracted to the permanent magnet for seating the base portion onto the support members thereby mounting the stylus in a proper position with respect to said stencil material.

3 Claims, 4 Drawing Figures

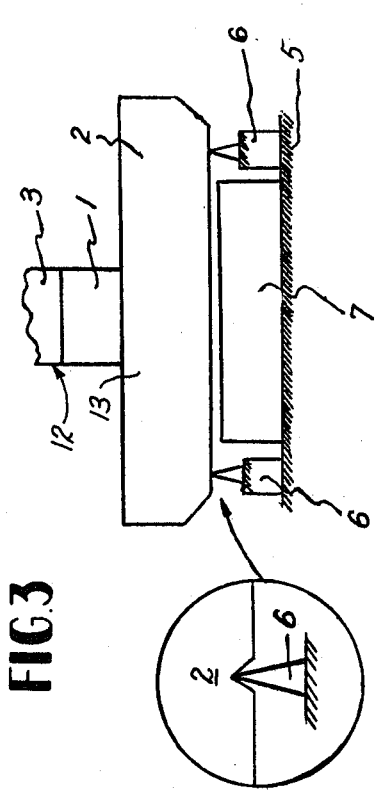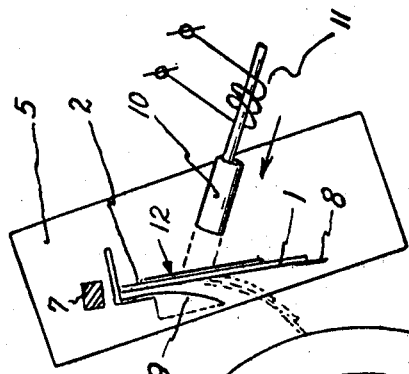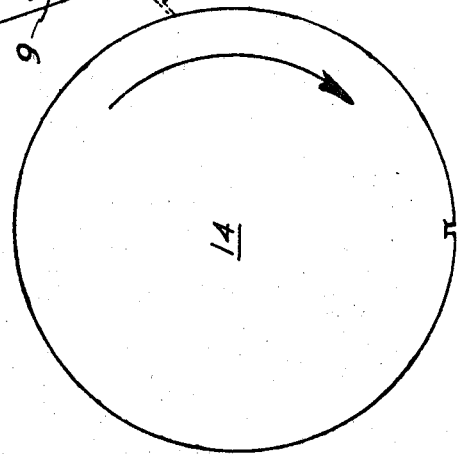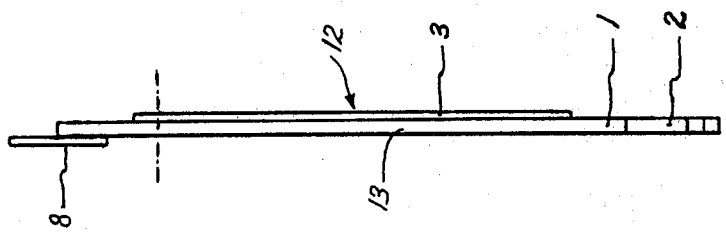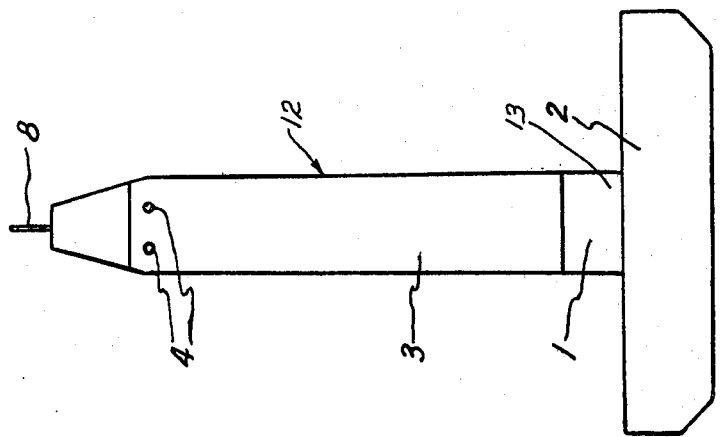

ELECTRONIC STENCIL ENGRAVING MACHINE STYLUS AND SUPPORT

This is a continuation of application Ser. No. 611,821 filed Sept. 9, 1975, now abandoned.

BACKGROUND OF THE INVENTION

The present invention refers to a support for the stylus of an electronic stencil engraving machine.

CROSS REFERENCE TO OTHER APPLICATIONS

The present invention relates to an improvement which may be used with the inventions described and claimed in the following corresponding U.S. patent applications: Ser. No. 612,638 filed Sept. 12, 1975, entitled: Electronic Circuit for Electronic Stencil Cutter and Ser. No. 612,636 filed Sept. 12, 1975, entitled: A circuit for an Electronic Stencil Cutting Machine. Ser. No. 611,820 filed Sept. 9, 1975, entitled: A Mechanism for the Application and Removal of a Stylus Wire on Stencil Material to be Engraved is also of interest. All of these applications are filed in the name of the present inventor and are licensed to the same licensee as is the present invention.

SUMMARY OF THE INVENTION

The main object of the present invention is to provide in a stencil cutting machine, a stylus support which dampens the oscillations of the stylus and which dissipates by friction the perturbing energy.

It is a further object of the invention to provide a stylus support assembly of the above-described type which permits and facilitates the instantaneous changing of the stylus while repositioning the stylus optimumly with respect to the stencil material being "cut".

In some known stencil cutting or engraving machines, the support for the engraving wire or stylus consists of a part which is secured by pressure joint into the supporting base, which part must be carefully centered into position by means of screws. Given the relative frequency with which said points must be replaced, the small available space and the limited size of the support, the operation for changing the stylus is extremely difficult and troublesome, with a resulting loss of time which renders the stencil cutting process more expensive. On the other hand, there are disturbances produced in the reproduction of stencils by the vibrations of the stylus originating as they cross the zone of union of the sensitive material placed on the material holding drum of the equipment, such vibrations and rebounds can cause deformations of the engraved information.

Presently an arrangement used to dissipate the energy of those vibrations consists in a loose rivetting which plays freely in an orifice provided in the support. Despite the advantages resulting from them they render a loss of definition or clarity in the engraving, and in practice establish a limit to the speed which can be achieved by said engraving.

For the purpose of solving the stated problems a support of a new type invented by the applicant proves ideal. The support consists in a thin laminated body in the shape of a "T", on the central branch of which there is placed a second laminated piece, attached together at one end only, as a member which dissipates energy by friction. The cross-branch at least is made of magnetic material, and is mounted at two contacts to two stays located at a short distance from each other, between which there is placed a permanent magnet, as it will be seen in more detail below.

DESCRIPTION OF THE DRAWING

In order for the present invention to be easily understood and applied, in its basic idea, there will be given below a precise description of one form of execution which is preferred, there being referred in same to the attached drawing, the whole being given only as a purely illustrative example of the present invention, without any limitative character.

In the drawing:

FIG. 1 is a planar view of the stylus support according to the present invention;

FIG. 2 consists of a 90° lateral view of the stylus of FIG. 1;

FIG. 3 shows in fragmented view, the magnetic fixation base for rapid positioning of the support, in the enlarged circle there is shown a possible form of contacts for the support; and FIG. 4 is a diagrammatical view of the support according to the invention positioned in relation to the drum for carrying the stencil material to be cut, and a means for drawing the stylus point to its engraving position with respect to the stencil material.

DETAILED DESCRIPTION OF THE DRAWING

In the figures, the same reference numbers indicate equal or corresponding parts.

As is well known, an electronic "stencil" engraving machine, such as the prior art machine sold by A. B. Dick Company as its Model 590 and described in "A. B. Dick Company Service Manual Model 590 Electronic Stencil Maker", Form 72-319 copyrighted 1972, makes a stencil by "burning" a hole in a stencil through electric discharge between a stylus and the drum carrying the stencil. The size of the hole is precisely governed by governing the amount of current flowing through the stylus. Such a stylus which has a stencil moving rapidly under it during use, and is subject to wear and must be replaced on a regular basis.

In accordance with the present invention and with particular reference to FIGS. 1 and 2 a relatively thin laminar body stylus support unit, generally designated by the number 12, is provided. The unit 12 includes a blade 13 in the shape of a "T" having a longitudinal branch 1 and a transverse branch 2. On one end of the blade 13, the end away from the branch 2, is affixed a stylus or wire 8. A thin blade 3 placed against the central longitudinal branch 1. Both blades 13 and 3 are fixed together by one end at points 4, for example. The arrangement of superposed blades makes it possible to dampen the oscillations of the stylus point 8, as it passes over the stencil material and clamp for holding the latter to the cylinder on which it is mounted, dissipating energy in the friction created by blade 3 against the central branch 1 of the blade 13.

The transverse branch 2 of the "T", at least, is made of magnetic material. The support base 5 provides two stays or stand-offs which receive the branch 2 at both ends thereof 6, and placed between those is a permanent magnet 7 affixed to base 5 and arranged so that it remains at a short distance from the magnetic branch 2 of the body of the support unit 12, without touching it. In that way, if there is placed on stays 6 the laminar body 1, 2, it will be retained in position by magnetic action, without the need for any later adjustment.

The stand-offs 6 are preferably, as is shown in the detailed enlargement at FIG. 3, knife edges which mate into grooves or notches formed in the edge of the transverse branch 2, one each formed toward both ends of the branch 2, of the blade 13.

In FIG. 4, there can be seen the laminated body 1, 2, with the engraving point 8 of the unit 12 is edge received on the knife edges 6 and normally projects outward from the magnet 7.

The unit 12, which, as with all electronic stylus support units in use carries the stencil "burning" electric current, is releasably edge captivated by the magnet 7 against the stand-offs such that it may be easily manually removed and replaced from the stencil cutting machine. There is placed a piece guide 9 on the base support 5. The device operating the engraving wire may be, among others, a pressure nucleus 10, operated by a solenoid 11, which when displacing the nucleus in the direction of the arrow, presses the laminar body 1, 2 against a curved guiding piece 9 until it is displaced to the engraving position indicated in broken lines. That is, it is bent over onto the stencil carrying member or drum 14.

It is logical to assume that when executing the present invention, it will be possible to introduce in it modifications of some details in construction and in the form of the supporting device described, without for as much leaving the fundamental principles which have been described and illustrated, and which can be summarized in the following claims.

What I claim is:

1. A replaceable stylus support unit for use in an electronic engraving machine of the type wherein a stencil or the like is removably affixed to a rotatable drum and swept past an adjacent stylus, the machine being provided with a base member for receiving the stylus unit, a magnet mounted adjacent to the base member and means for selectively bending the unit onto the drum, the stylus support unit comprising a first blade having a front end portion and a rear portion having an edge, which rear portion is made of a magnetic material, and which front portion has a stylus mounted thereon;

a second blade attached at one of its ends only to said first blade and positioned in an overlying and normally contacting relationship with respect thereto, the opposite end of said second blade being freely movable forward and away from said first blade for dampening vibrations of said stylus by the friction created due to the movement of said second blade against said first blade;

whereby, said stylus support unit has its rear portion received by the base means and releasably captivated there by the magnet in a position overlaying the drum and may be bent into the drum by the means for selectively bending the unit, and whereby the stylus support unit may be selectively and easily removed and released from the stencil engraving machine by moving it away from the magnet.

2. The invention of claim 1, in combination with an electronic stencil engraving machine having a rotatable drum on which a stencil may be affixed, a base member adjacent to said drum in which the rear portion of said stylus unit is received, a magnet adjacent to the base member which releasably captivates said stylus unit to said base member, and means for selectively bending the stylus support unit by moving the front portion of said first blade toward said drum, and further particularized in that said first blade is shaped as a "T" with the rear portion of said unit being the transverse branch of the T, and wherein said base member includes means for receiving the rear portion at both ends of the branch.

3. The invention as claimed in claim 1 in combination with an electronic stencil cutting machine having a base member which receives the rear edge portion of said unit and a magnet adjacent thereto, wherein said first blade is T shaped with said rear portion being a transverse branch and said base member including a pair of spaced apart knife-like support members for engaging said transverse branch in notches formed in said branch.

* * * * *